Figure 1:
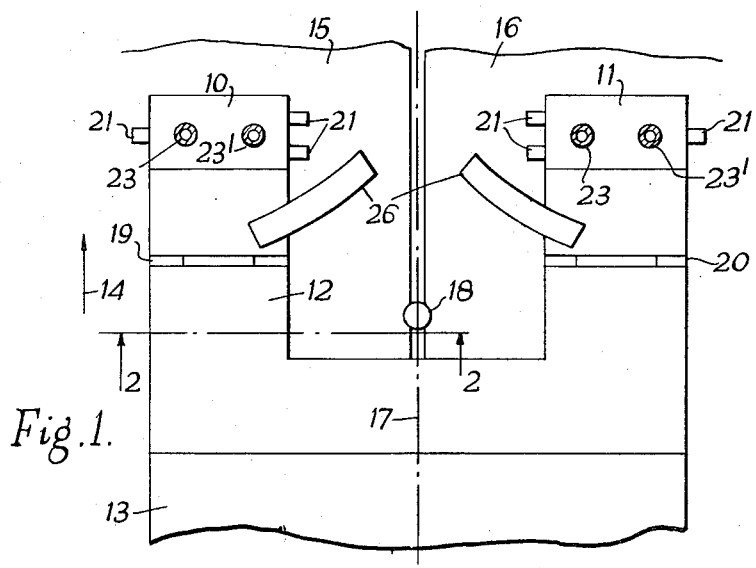

Aug. 28, 1962  G. A. D. GORDON ETAL  3,050,988
ULTRASONIC TESTING

Filed Feb. 13, 1959  7 Sheets-Sheet 1

INVENTORS
G.A.D. GORDON, H.W. TAYLOR
and J.M.L. WOOD
BY
Moore and Hall
ATTORNEYS INVENTORS
G.A.D. GORDON, H.W. TAYLOR
and J.M.L. WOOD
BY
Moore and Hall
ATTORNEYS

United States Patent Office 3,050,988
Patented Aug. 28, 1962

3,050,988
ULTRASONIC TESTING
George Andrew Douglas Gordon, Richmond, and Harold William Taylor and John Malcolm Lester Wood, Barkingside, England, assignors, by mesne assignments, to S. Smith & Sons (England) Ltd., Cricklewood, London, England, a corporation of England
Filed Feb. 13, 1959, Ser. No. 793,074
Claims priority, application Great Britain Feb. 18, 1958
4 Claims. (Cl. 73—67.5)

The present invention relates to ultrasonic testing and has for its principal object to provide a comparison method of testing, for instance by providing means whereby the wave-transmitting characteristics of two different paths in a body can be readily compared.

According to the present invention there is provided ultrasonic testing apparatus comprising transducer means for injecting pulses of ultrasonic waves into a body under test and for receiving pulses of the waves after traversing the body and means permitting a visual comparison, or for effecting an electric comparison, between the received pulses and either other pulses which have traversed a path different from that traversed by the first-named received pulses or a reference pulse.

In order to permit a visual comparison means may be provided for displaying the pulses to be compared as deflections of a light spot in opposite directions from a base line.

When an electrical comparison is used, there may be provided means responsive to the difference between the compared pulses for controlling the position of the transducer means.

The invention further provides ultrasonic testing apparatus comprising transducer means for injecting ultrasonic waves into a body under test and for receiving the waves after traversing the body along two different paths, and switching means arranged to apply signals derived from the transducer means in response to waves traversing the two paths alternately to a visual display device, the switching being effected at a frequency which permits a visual comparison of the two displays.

Depending upon circumstances, there may be used two separate transmitting transducers and one or two receiving transducers, one transmitting transducer and two receiving transducers, or two combined transmitting and receiving transducers.

The transmitting transducer or transducers may be driven in known manner from a source of electrical oscillations of ultrasonic frequency, bursts or pulses of these oscillations being applied to the transducer or transducers.

When the pulses are transmitted into and received from the same surface of the body under test the received pulses are echoes from the boundary or boundaries of the body and from any discontinuities. When the pulses are transmitted into one surface of the body and received at the opposite surface the feature of interest is usually the varying attenuations produced in the waves by the part of the body traversed thereby.

The display device is conveniently a cathode ray tube. When the screen of the tube has a short persistence the switching should be effected at a frequency above the persistence of vision, for instance at 25 cycles per second or more. Switching may take place after the reception of the waves from each transmitted pulse. With a screen of suitably long persistence, however, a much slower rate of switching can be used, for instance about 4 cycles per second, a plurality of pulses of ultrasonic waves being transmitted between each switching. In any case switching should be synchronised with the transmitted pulses and such that the switching from one path should of course not take place until all the signals of interest from that path have been received.

The display may take many forms. A suitable form is obtained by deflecting a cathode ray beam along the X-co-ordinate by means of a saw-tooth wave generated in a time base triggered at, or just after, the transmission of each pulse and by applying the received signals, after rectification, to deflect the beam in the Y-co-ordinate. In this case the signals from one path may be displayed by deflection from the base line constituted by the X-co-ordinate in one direction and those from the other path by deflection in the opposite direction. If the traces produced by the two sets of signals are alike the pattern will appear symmetrical with respect to the X-co-ordinate. If, however, there is any difference between the two sets of signals, the resulting lack of symmetry is readily visible. Much smaller asymmetries are detectable than if the traces from the two sets of signals were examined separately.

The traces may be expanded and off-set in known manner by increasing the speed of scanning and triggering the time base at a selected time after transmission of each pulse.

When two transmitting transducers and one receiving transducer are used, the switching means may switch over the drive from one transmitting transducer to the other and simultaneously switch the receiving transducer from one display to the other, for instance from one Y-deflecting plate to the other.

When two transmitting transducers each associated with a separate receiving transducer are used, switching may take place either at the transmitting transducers, the receiving transducers, or both.

Figure 2:
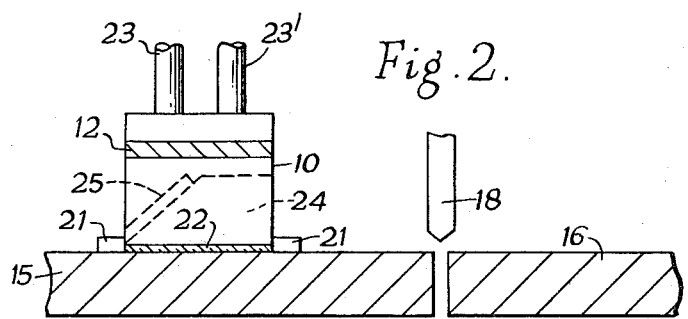
Figure 3:
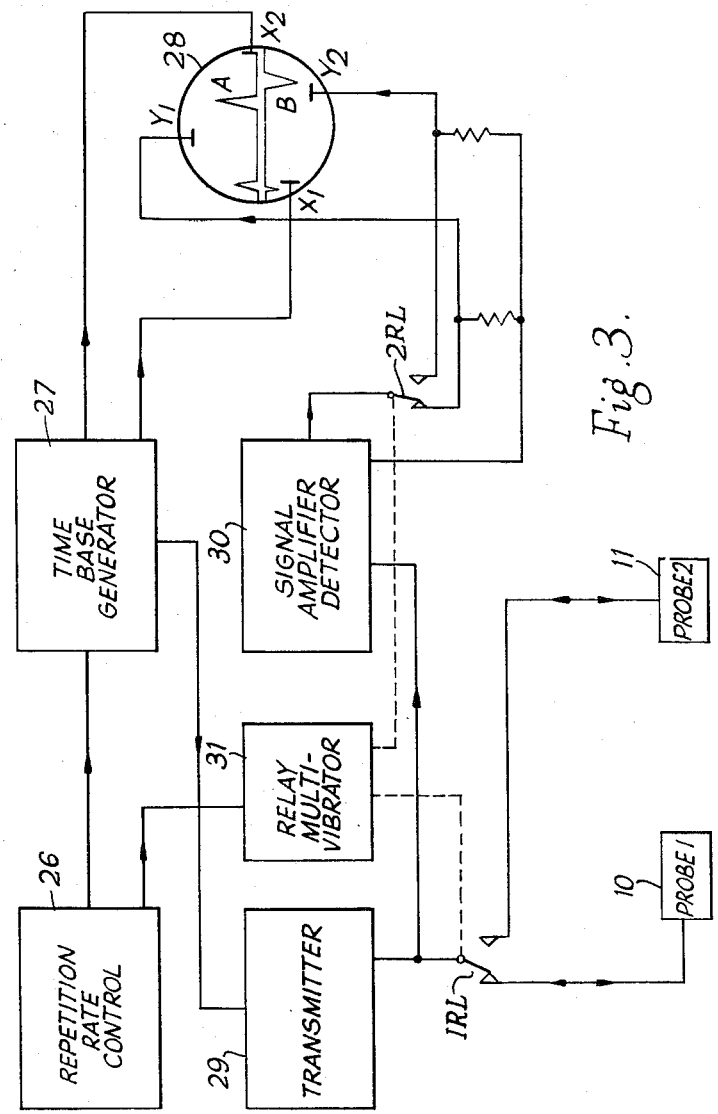
Figure 5:
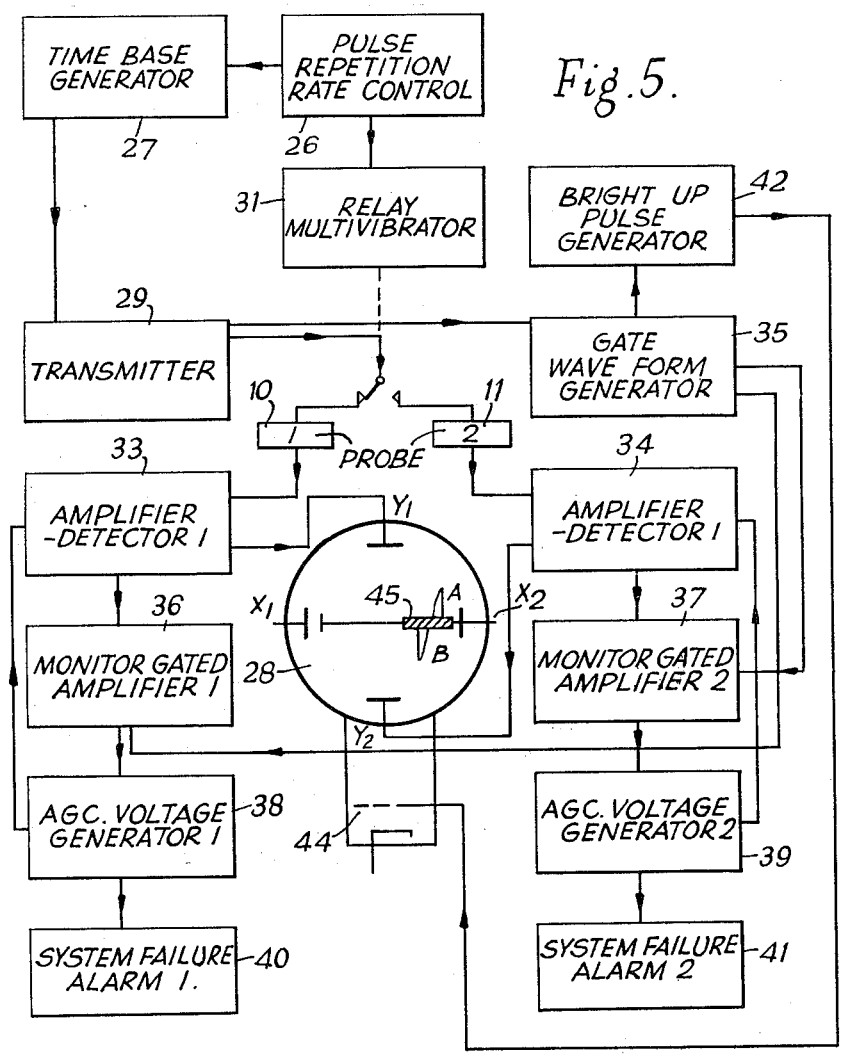
Figure 6:
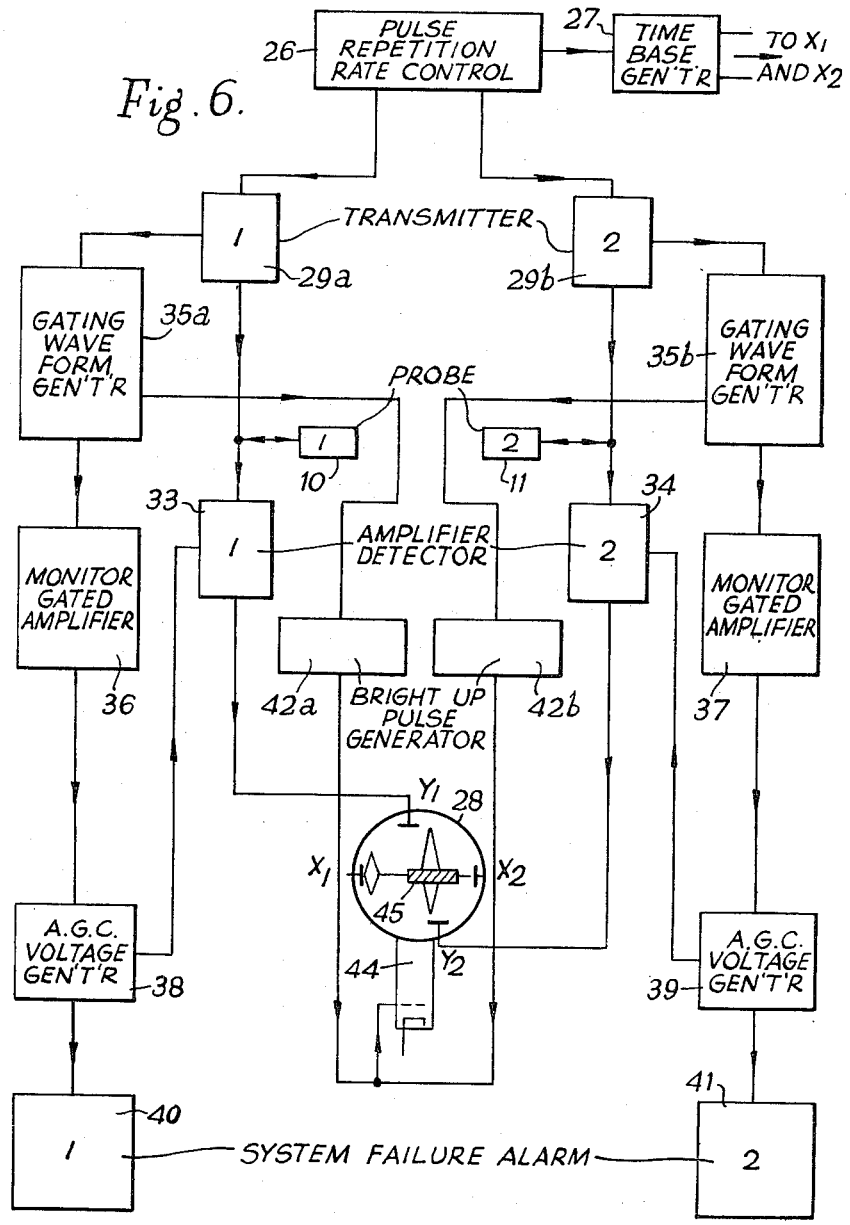
Figure 7:
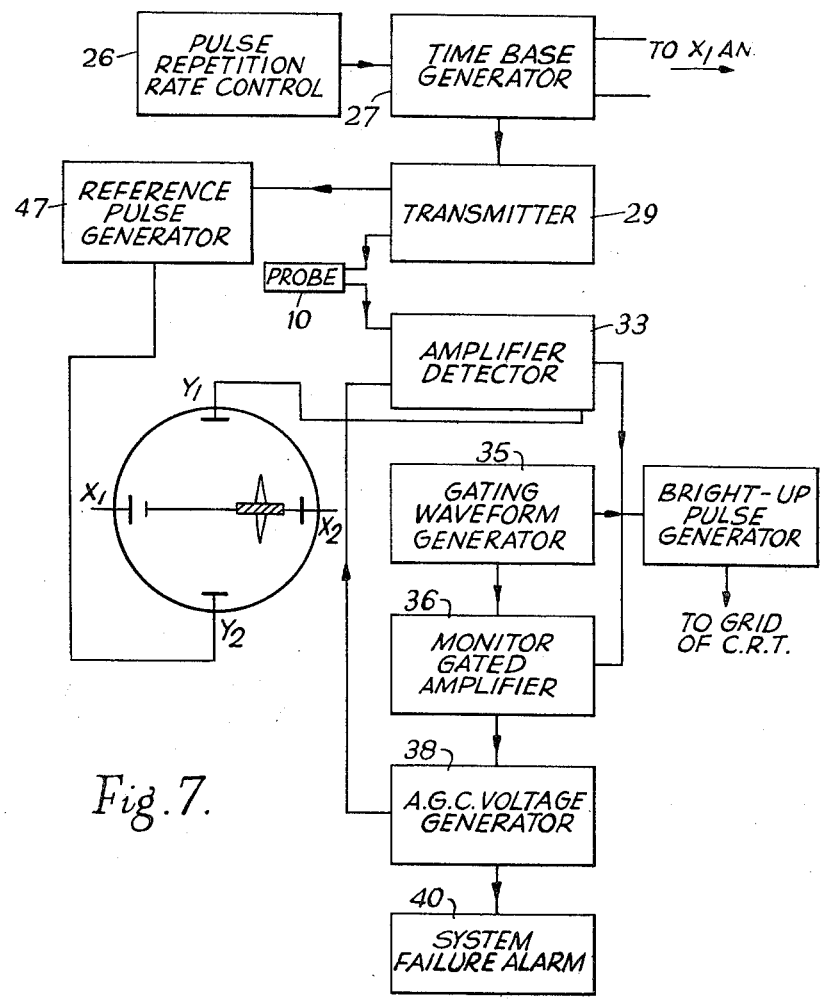
Figure 8:
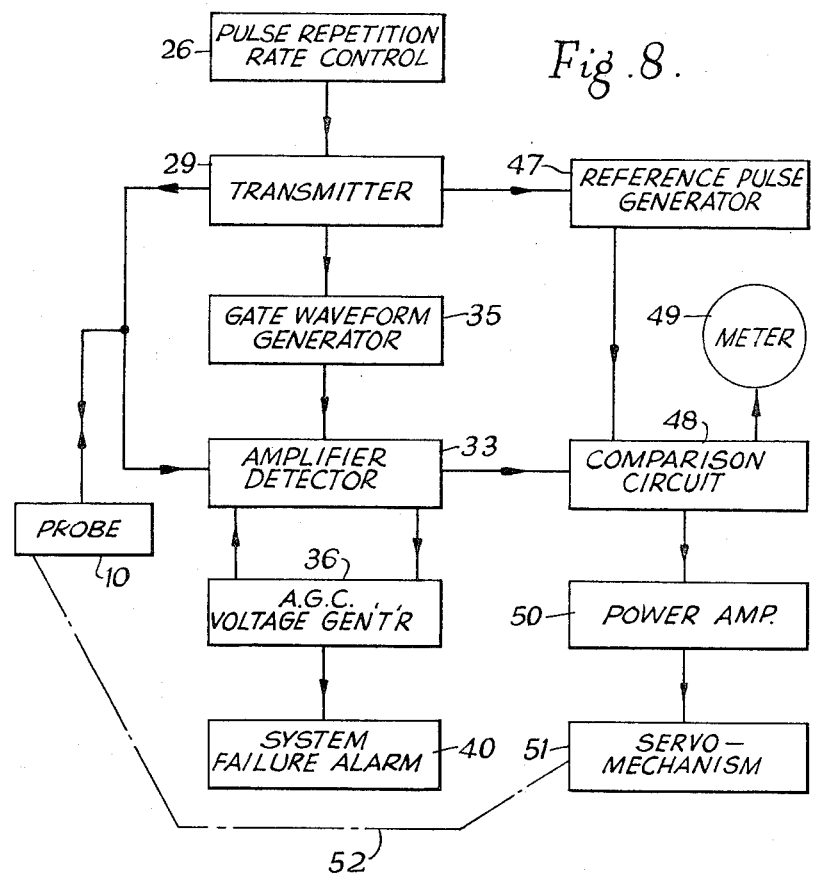
Figure 9:
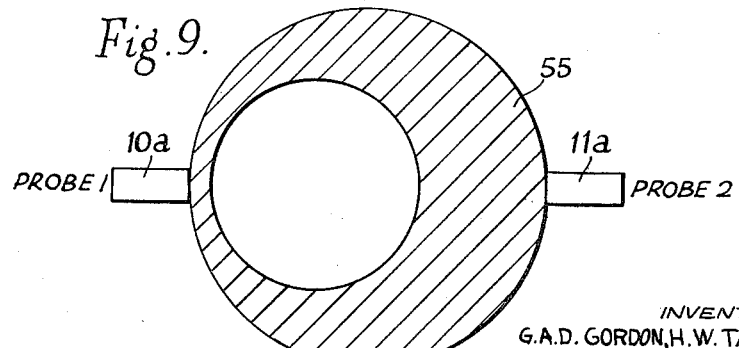

The invention will be described, by way of example with reference to the accompanying drawings in which, FIG. 1 is a diagrammatic plan view of part of one embodiment of the invention for use in welding, FIG. 2 is a view in part sectional elevation on the line 2—2 of FIG. 1 of a part of the apparatus of FIG. 1, FIG. 3 is an explanatory diagram of an embodiment of the invention using the apparatus of FIG. 1, FIGS. 4 to 6 show modified block explanatory diagrams for use with the apparatus of FIG. 1, FIGS. 7 and 8 are block explanatory diagrams of two other embodiments of the invention, and FIG. 9 is a diagrammatic sectional view illustrating one application of the invention.

Referring to FIGS. 1 and 2, two probe assemblies 10 and 11 are mounted on a U-shaped member 12 which, in turn, is mounted on the frame 13 of a welding machine arranged to be movable in the direction of the arrow 14 over two plates 15 and 16 to be welded together along a welding line 17. A welding electrode is indicated schematically at 18. The probe assemblies are hinged at 19 and 20 to the U-shaped member 12 so as to be capable of limited movement in a vertical direction to allow for irregularities in the surfaces of the plates 15 and 16 but incapable of movement in other directions relatively to the U-shaped member. Each probe assembly is supported upon three rollers 21 which bear upon the surfaces of the plates 15 and 16 and maintain a fixed spacing between the under surfaces of the probes and the surfaces of the plates. A coupling liquid, such as water, is provided as indicated at 22 in FIG. 2, between these surfaces. The liquid is introduced through a pipe 23 and sucked out through a pipe 23'. It is important to so arrange the suction that no excess liquid leaks over the surfaces of the plates towards the weld. One form of probe assembly suitable for use in the invention is shown and described in U.S. Patent No. 2,871,381 to A. B. C. Rankin for Ultrasonic Testing of Materials assigned to the same assignee as the present patent.

As indicated in broken lines in FIG. 2 each probe assembly may comprise one or more probes 24 and one or more transducers, such as piezo electric crystals, 25.

As shown in FIG. 1 (but not in FIG. 2) reflectors 26 may be provided to protect the probes from heat and splatter from the welding electrode 18. The probes are preferably, as shown in FIG. 1, mounted ahead of the welding electrode 18.

The probes may be arranged to operate with either transverse waves, surface waves, or Lamb waves. Each probe assembly may comprise either a single transmitting-receiving probe or two separate probes, one for transmitting and the other for receiving.

Referring to FIG. 3, a repetition rate control circuit 26 generates pulses which control the rate of injection of pulses of ultrasonic energy with the material under test. These pulses are fed to a time base generator 27 which supplies deflecting voltages to the X plates $X_1$ and $X_2$ of a cathode ray tube 28. Pulses from the time base generator 27 are fed to an ultrasonic transmitter 29 coupled through reversing relay contacts 1RL to transmitting-receiving probes 10 and 11. The probes are also coupled through the same relay contacts to a signal amplifier and detector 30 the output of which is connected through further reversing relay contacts 2RL to either of the Y plates $Y_1$ or $Y_2$ of the cathode ray tube. The two sets of relay contacts 1RL and 2RL are operated in step with one another by a relay multi-vibrator 31.

In use with the welding machine of FIGS. 1 and 2, when the contacts are in the positions shown in FIG. 3, echoes from the edge of the plate 15 to be welded received by the probe 10 are applied, after amplification, to the plate $Y_1$, and produce a display A by deflecting the cathode ray beam upward. When the contacts are reversed, echoes received by the probe 11 from the edge of the plate 16 are applied to the plate $Y_2$ and produce a display B by deflecting the cathode ray beam downward. The breaks-through of the transmitted pulses are indicated at the left of the display. The operator guides the welding machine in such a manner that the leading edges (that is the left hand edges in FIG. 3) of the pulses A and B are maintained in vertical alignment. This is easily done because the two displays are close together.

Figure 4:
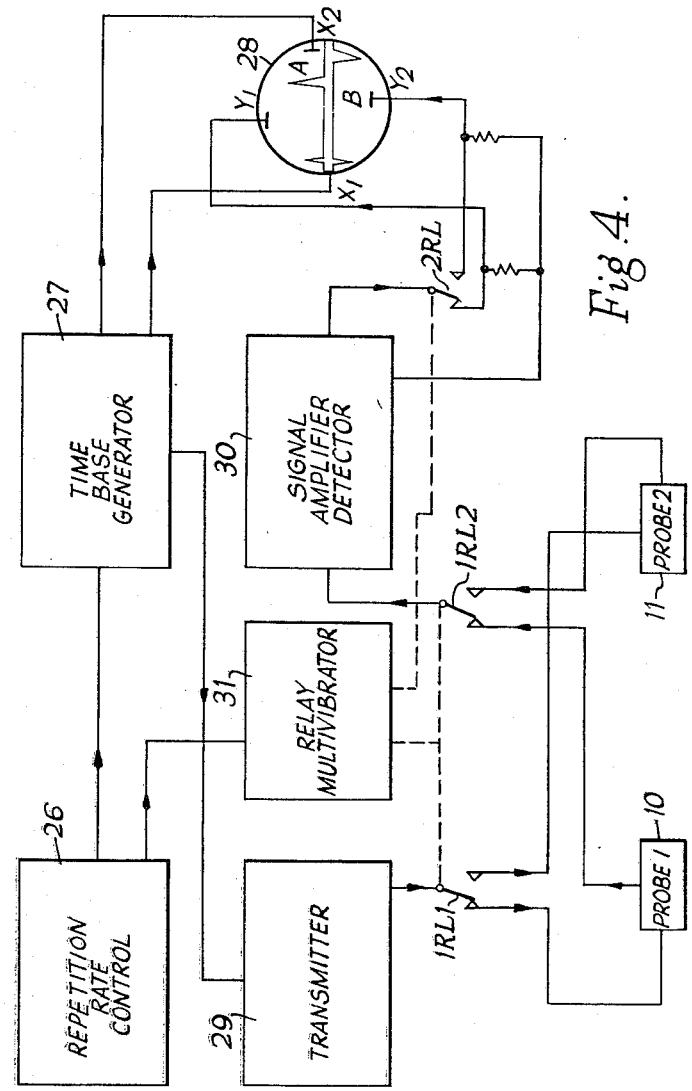

When the probe assemblies comprise separate probes for transmitting and receiving additional relay contacts are required. A suitable modification of FIG. 3 for this purpose is shown in FIG. 4. The two sets of contacts 1RL1 and 1RL2 are shown as driven in common.

The ultrasonic beams between the two probe assemblies and the weld may be differently attenuated in which case the first few cycles in one of the two echo signals may not have sufficient amplitude to contribute to the visible leading edge of the pulse A or B in the display. Thus when in such a case the operator aligns the leading edges the welding electrode will be displaced to one side or the other of the welding line by an amount dependent upon the number of cycles lost.

This difficulty can be overcome as shown in FIG. 5 which is a modification of FIG. 3. Each probe 10, 11 which is a transmitting-receiving probe, is coupled through a separate amplifier 33, 34 to the plates $Y_1$ and $Y_2$. A gating waveform generator 35 generates gating pulses in step with the transmission of pulses from 29 and these gating pulses are applied to monitor gated amplifiers 36 and 37 which pass signals from the amplifier 33 or 34 only during predetermined times. These times are chosen to include the echoes from the edges of the plates under test. The signals are passed to AGC voltage generators 38 and 39 which generate gain control voltages which are fed to the amplifiers 33 and 34 and control their gain in such a way as to maintain the amplitude of the boundary echo substantially constant. It may be arranged that while the probe 10 is operative the gain control voltage on the amplifier 34 is held constant and while the probe 11 is operative the gain control voltage on the amplifier 33 is held constant.

If the ultrasonic pulses are, for any reason, heavily attenuated, the correction required may be beyond the capabilities of the gain control means 38 and 39. Under these conditions the gain control voltage is at a minimum and it is arranged that a system failure alarm 40 or 41 is then operated.

The timing of the gating pulses from 35 is made adjustable and in order to permit monitoring of these pulses they may be applied to a bright-up pulse generator 42 which generates a positive-going pulse for the duration of each gating pulse. This positive-going pulse is applied to the control grid 44 of the cathode ray tube 28 to brighten the trace. Such a brightened part of the trace is shown cross-hatched at 45.

The circuits of FIGS. 3 to 5 make use of electro-mechanical relays for switching. FIG. 6 shows a completely electronic arrangement. Each probe 10 and 11 has associated therewith a separate transmitter 29a or 29b, controlled from a common pulse repetition rate control circuit 26, a separate gating waveform generator 35a or 35b and a separate bright-up generator 42a or 42b. Otherwise the circut agrees closely with that of FIG. 5.

For some purposes it may be desired to compare signals received by one probe with a standard or reference signal rather than with a signal from another probe. FIG. 7 shows a circuit for this purpose which is largely constituted by one half of the circuit of FIG. 5. Thus in FIG. 7 the probe 11 and its associated circuitry are replaced by a reference pulse generator 47 which is synchronised with the transmitter 29.

FIG. 8 shows a modification of FIG. 7 in which the presentation is by a meter instead of by a cathode ray tube and in which the result of the comparison is used for control purposes. The outputs of the amplifier-detector 33 and the reference pulse generator are compared in a comparison circuit 48 and the difference is displayed by a meter 49. In addition the difference is fed to a power amplifier 50 which drives a servo-mechanism 51 coupled as indicated by broken line 52 to the probe 10. The mechanism can be arranged to move the probe 10 in such a manner as to maintain the difference at a minimum. Thus, as applied to welding, the servo-mechanism may be arranged to move the carriage of the welding machine in such a manner as to maintain the welding electrode on the welding line.

The invention can be applied to measure, and if desired control automatically, the thickness of material relatively to a standard or the relative thickness of different parts of a body. For instance, as shown in FIG. 9, the invention can be applied to control the manufacture of pipes by detecting eccentricity of the bore and correcting the detected eccentricity automatically or manually. The two probe assemblies 10a and 11a may be used in a circuit such as is described with reference to FIG. 3, 4, 5 or 6 and the wall thicknesses of the pipe 55 on the two sides compared.

The invention can be applied in many fields other than that described, for instance in medicine. In medicine, the invention can be used to make a comparison between two sides of the human body or to compare two adjacent regions on the body, one over normal tissue and the other over abnormal tissue. In may be used, for example, to reveal displacement of the brain within the skull.

In industry, the invention has application to the comparison of echo patterns from a complex casting with the echo patterns from a standard casting known to be sound. It also permits the comparison of two sides of any object in which symmetry is important.

While there have been described above what are presently believed to be the preferred forms of the invention, variations thereof will be obvious to those skilled in the art and all such changes and variations which fall within

We claim:

1. Ultrasonic testing apparatus comprising in combination, transducer means for injecting recurrent pulses of ultrasonic waves into a body under test and for receiving pulses of said waves after their traversal of said body, a source of further pulses of the same frequency as said recurrent pulses, an electrical comparator having two inputs and one output, means coupling said transducer means and said source of further pulses to said inputs respectively, and a responsive device coupled to the output of said comparator and responsive to the time difference between said received pulses and said further pulses, said responsive device comprising means for varying the position of said transducer means in such a sense as to tend to reduce said difference.

2. Ultrasonic testing apparatus comprising in combination, two sources of ultrasonic waves, at least one of said sources comprising transducer means for injecting ultrasonic waves into a body under test, said body under test producing at least one train of echo signals, signal comparing means having two separate inputs and one output, means supplying separate signals originating from said two sources to said two separate inputs, at least one of said separate signals supplied to said separate inputs comprising echo signals from said body under test in response to the application of ultrasonic waves to said body by the transducer means, said signal comparing means generating at the output thereof difference signals representing the time difference between the signals applied to said two separate inputs, and means electrically coupled to said output and mechanically coupled to said transducer means for moving said transducer means relative to said body in a sense such as to tend to reduce said difference signals.

3. Apparatus according to claim 2, wherein said two sources of ultrasonic waves are constructed to produce trains of pulses and both said sources comprise transducer means constructed to inject ultrasonic pulsed waves into said body under test.

4. Apparatus according to claim 3, wherein said one source of ultrasonic waves generates pulses of ultrasonic waves and wherein the other of said sources of ultrasonic waves is a source of reference pulses of ultrasonic waves of fixed amplitude.

References Cited in the file of this patent

UNITED STATES PATENTS

| | | |
|---|---|---|
| 2,618,968 | McConnell | Nov. 25, 1952 |
| 2,640,190 | Rines | May 26, 1953 |
| 2,661,714 | Greenwood et al. | Dec. 8, 1953 |
| 2,667,063 | Cunningham | Jan. 26, 1954 |
| 2,839,916 | Van Valkenburg et al. | Aug. 19, 1954 |
| 2,893,239 | Renaut | July 7, 1959 |
| 2,921,466 | Nerwin | Jan. 19, 1960 |

OTHER REFERENCES

Germany, application S–34,259, Dec. 6, 1956.